United States Patent Office 3,182,937
Patented May 11, 1965

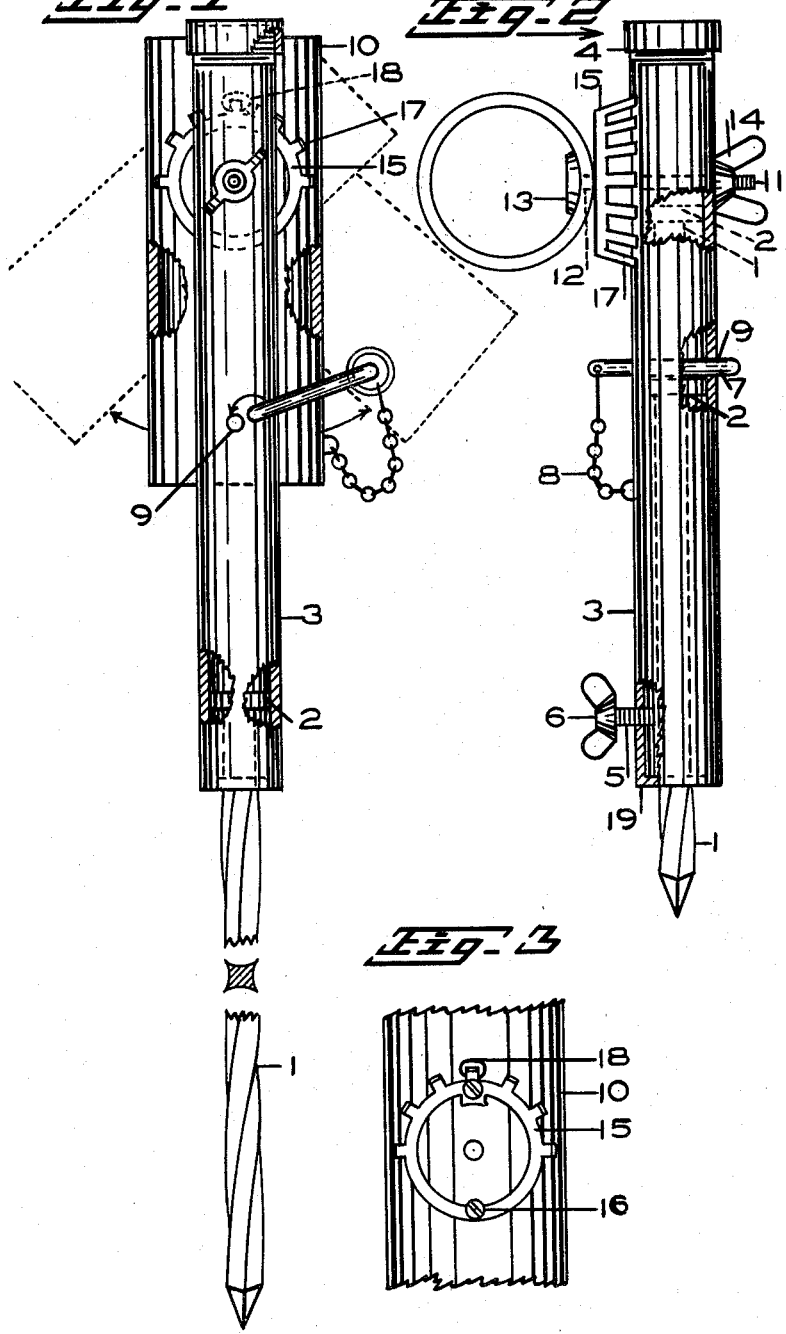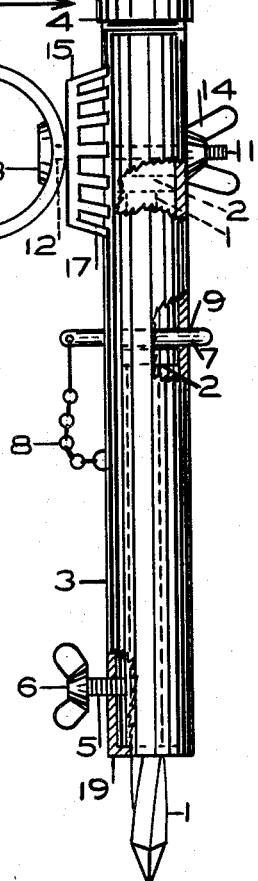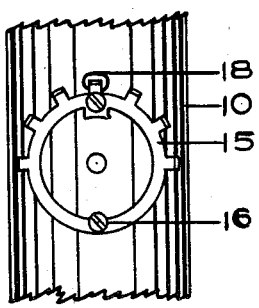

3,182,937
FISHING ROD HOLDER
Richard T. Manning, Box 242, Pincher Creek,
Alberta, Canada
Filed July 1, 1964, Ser. No. 379,619
5 Claims. (Cl. 248—45)

This invention relates to holders for fishing rods, having particular reference to a holding devive by which a rod may be supported on ice, ground or sand and held thereby in a position for fishing.

In the art to which the invention relates, in fishing by use of a rod and line it is desirable to be able to set the rod imbedded in or fixed in relation to the ground or like penetrable support and by which the rod may be held at a desired angle for fishing.

For this the present invention is concerned with providing a holder combining a tube in which the handle end of the fishing rod is inserted and a stand pipe to which the tube is attachable to be set at selected angles relative thereto, and a retractable spike in the stand pipe, the spike being adapted for screwing into or being driven into the ground, or into ice, sand or like pentrable material.

Additionally the holder embodies means for securing the spike in the stand pipe projected into a position to be forced into the ground, either screwed or driven therein, or retracted within the tube wholly or fixed in any desired retracted position.

Other features and advantages of the invention will become apparent by reference to the accompanying description taken in conjunction with the drawings.

In the drawings, wherein is illustrated a preferred embodiment of the invention, FIG. 1 is a side view of the holder assembled, shown with the spike projected and the rod holding tube secured to the stand pipe parallel therewith, other positions of the tube at which it may be set in relation to the stand pipe being indicated by dashed lines, and parts being shown broken away and parts in section.

FIG. 2 is a side view of the rod holder, shown with the spike projected and the spike securing pin inserted to hold the stand pipe on the spike when forcing the spike into the ground, the fully retracted position of the spike being indicated by dashed lines, and parts of the holder being shown broken away and parts in section.

FIG. 3 is an enlarged side view showing a fragment of the rod holding tube and including the disc for setting the tube at selected angles in relation to the stand pipe.

Having reference to the drawings, a twist spike 1 with a head 2 is shown mounted slidable axially in a stand pipe 3, the stand pipe having a replaceable cap 4 threaded on its upper end.

The spike may be engaged with the stand pipe by a set screw 5 threaded in the stand pipe and engageable against the spike, the set screw including a winged nut type of head 6. There is further included a pin 7 attached to the stand pipe by a chain 8 and insertable in aligned openings 9, and by which with the spike head 2 against the pin 7 the spike may be driven into the ground by pounding on the cap 4 of the stand pipe. Additionally the screw 5 may be set bearing against the spike and the stand pipe rotated to screw the spike into the ground.

On the stand pipe is attachable a rod holding tube 10 by a bolt 11, the bolt being insertable through an opening at 12 in the tube and having a head 13 on the inner end and a winged nut 14 threaded on the outer end, the bolt being insertable through complementary aligned openings in the stand pipe.

For setting the rod holding tube at selected positions in relation to the stand pipe a disc 15 is mounted on the bolt 11 between the rod holding tube and the stand pipe fixed to the tube by a screw 16 (FIG. 3), the disc having a semi-circular series of outwardly projecting lugs 17, one or other of which may be engageable in an opening 18 in the stand pipe to hold the disc against turning when the nut 14 on the bolt 11 is tightened.

In the use of the device the spike 1 may be partially retracted with the head 2 bearing against the pin 7, in which position the spike may be driven into hard ground or ice by pounding on the cap 4 of the stand pipe. Or the set screw 5 may be tightened against the spike to prevent the spike turning in the stand pipe and the spike may then be screwed into soft ground or sand. When the spike has been inserted in the ground the stand pipe may be raised and secured on the spike at any desired height by the set screw 5. The spike is held centrally in the lower end of the pipe 3 by an end pipe 19 fixed in the loweer end of the pipe and having a central opening for insertion of the spike. This gives rigidity and trueness of movement to the spike and also serves to clean the spike when it is retracted.

For securing the rod holding tube at the desired angle the nut 14 is loosened and the tube 10 with its attached disc 15 is turned and one of the lugs 17 is engaged with the opening 18 in the stand pipe, and the nut 14 is then tightened.

For storing the holder or for travel, the spike 1 is retracted fully within the pipe 3, as indicated at 12' in FIGURE 2, and the screw 5 is then tightened.

The tube 10 may be of any preferred size to accommodate any size of fishing rod handle. It can be used with the specialized ice fishing rod without additional brackets, supports or equipment of any kind, or it can be used with the conventional type of summer fishing equipment. The holder can be used on ice, mud, hard ground, sand or other substance into which the spike may be screwed or driven.

I claim:

1. A holder for fishing rods including a rod holding tube, a stand pipe, a bolt attaching the rod holding tube to the stand pipe with said tube and pipe free to move in parallel planes, and a disc on the bolt fixed to said tube interposed between the tube and stand pipe, said disc having a series of outwardly projecting lugs and the stand pipe having an opening in which one or other of the lugs may be engaged.

2. A holder for fishing rods as set out in claim 1 and including a spike mounted endwise slidable in the stand pipe projecting outwardly through the lower end thereof, and means in the stand pipe engageable with the spike by which the spike may be held against endwise movement in the stand pipe.

3. A holder for fishing rods as set out in claim 2 and including a pin transversely insertable through the stand pipe, said pin forming a stop against upward movement of the spike in the stand pipe with said spike projecting outwardly through the lower end of said pipe by which pressure applied to the upper end of the stand pipe may drive the spike into the ground.

4. A holder for fishing rods comprising a tube in which the fishing rod is insertable, a stand pipe, a spike mounted endwise slidable in the stand pipe and projectable through the lower end thereof, a set screw threaded in the stand pipe and engageable with the spike to hold the spike against endwise movement in the pipe, a spoke holding pin, the stand pipe having transverse aligned openings therein in which the pin is insertable to prevent upward movement of the spike in the pipe by which the spike may be forced into the ground by applying pressure on the upper end of the tube, and means attaching the rod holding tube to the stand pipe.

5. A holder for fishing rods as set out in claim 4 and including a disc fixed to the tube interposed between the tube and stand pipe, said disc having a series of lugs projecting outwardly thereof, and the stand pipe having an opening therein with which one of the lugs may be engaged.

References Cited by the Examiner
UNITED STATES PATENTS

| | | | |
|---|---|---|---|
| 1,719,695 | 7/29 | Ferguson | 248—38 |
| 2,430,112 | 11/47 | Hamre | 248—42 |
| 2,553,231 | 5/51 | Bayto | 248—42 |
| 2,787,431 | 4/57 | Smith | 248—46 |

CLAUDE A. LE ROY, *Primary Examiner.*